US009887973B2

(12) United States Patent
Burba et al.

(10) Patent No.: US 9,887,973 B2
(45) Date of Patent: Feb. 6, 2018

(54) PRIVATE PEER-TO-PEER DATA TRANSFERS

(71) Applicant: Microsoft Technology Licensing, LLC, Redmond, WA (US)

(72) Inventors: Alex Burba, Seattle, WA (US); Brandon T. Hunt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/730,220

(22) Filed: Jun. 3, 2015

(65) Prior Publication Data

US 2016/0359821 A1    Dec. 8, 2016

(51) Int. Cl.
*H04L 29/06* (2006.01)
*H04L 29/08* (2006.01)

(52) U.S. Cl.
CPC .......... *H04L 63/0464* (2013.01); *H04L 67/06* (2013.01); *H04L 67/104* (2013.01)

(58) Field of Classification Search
CPC ... H04L 63/0464; H04L 67/06; H04L 67/104; H04L 63/0428; H04L 2209/42; H04L 63/0407; H04L 63/0421; G06F 17/30206; H04N 21/632
USPC .................................. 713/163, 153; 726/14
See application file for complete search history.

(56) References Cited

U.S. PATENT DOCUMENTS

| | | | |
|---|---|---|---|
| 6,266,704 B1 * | 7/2001 | Reed ...................... | H04L 45/00 709/238 |
| 7,127,613 B2 | 10/2006 | Pabla et al. | |
| 7,159,108 B2 * | 1/2007 | Hariharan .......... | H04L 63/0414 713/153 |
| 7,472,277 B2 * | 12/2008 | Halcrow ............ | G06Q 20/3674 705/67 |
| 7,865,715 B2 | 1/2011 | Xu et al. | |
| 8,032,583 B2 | 10/2011 | Liu et al. | |
| 8,086,847 B2 | 12/2011 | Singh | |
| 8,365,301 B2 | 1/2013 | Miller | |
| 8,606,898 B1 | 12/2013 | Phatak | |
| 8,688,856 B2 | 4/2014 | McClain et al. | |
| 8,755,392 B2 | 6/2014 | Traversat et al. | |
| 8,902,864 B2 | 12/2014 | Laroia et al. | |

(Continued)

OTHER PUBLICATIONS

Blond et al., "Towards Efficient Traffic-analysis Resistant Anonymity Networks", In Proceeding of ACM Special Interest Group on Data Communication, Aug. 12, 2013, 12 Pages.

(Continued)

*Primary Examiner* — Oleg Korsak
*Assistant Examiner* — Feliciano Mejia
(74) *Attorney, Agent, or Firm* — Patent GC LLC (57) ABSTRACT

A computer system implements a peer-to-peer network that permits peer-to-peer data transfers with privacy with respect to the identities of requestor peers, provider peers and the requested data. The peer-to-peer network encrypts each communication among peers, and each message, whether a request or response, is transmitted through at least one intermediate peer. Each message received by any peer in the system appears the same to each peer in the sense that the message does not reveal how many intermediate peers have processed or will process the message. Further, a source of content is not revealed as a source; and a requestor of content is not revealed as a requestor.

19 Claims, 6 Drawing Sheets

(56) References Cited

U.S. PATENT DOCUMENTS

| | | |
|---|---|---|
| 9,118,691 B2 | 8/2015 | Ramankrishnan et al. |
| 9,197,600 B2 * | 11/2015 | L'Heureux ............ H04L 63/02 |
| 9,531,801 B1 * | 12/2016 | Cantrell ............... H04L 67/104 |
| 2009/0106393 A1 * | 4/2009 | Parr ................... H04L 63/0428 709/218 |
| 2011/0035503 A1 | 2/2011 | Zaid et al. |
| 2011/0082939 A1 | 4/2011 | Montemurro et al. |
| 2014/0025987 A1 | 1/2014 | Kern et al. |

OTHER PUBLICATIONS

Haugen, Matthew, "Open Internet P2P Socket Connection", published on: Aug. 12, 2014 Available at: http://stackoverflow.com/questions/25253963/open-internet-p2p-socket-connection.

Saboori et al., "Anonymous Communication in Peer-to-Peer Networks for Providing more Privacy and Security", In International Journal of Modeling and Optimization, vol. 2, No. 3, Jun. 2012, pp. 217-221.

Goel, et al., "Herbivore: A Scalable and Efficient Protocol for Anonymous Communication", In Technical Report, Feb. 2003, 17 Pages.

Chen et al., "On the Anonymity and Traceability of Peer-To-Peer VOIP Calls", In IEEE Network, vol. 20, Issue 5, Sep. 2006, pp. 32-37.

\* cited by examiner

PRIVATE PEER-TO-PEER DATA TRANSFERS

BACKGROUND

A peer-to-peer network includes a set of computers interconnected over a computer network. The set of computers is dynamic and scalable in the sense that any computer, called a peer, can be added to or removed from the set of computers. Each computer on the peer-to-peer network implements the same communication protocol through which each computer can request, or respond to a request for, data. Peer-to-peer networks are commonly used to implement shared file systems in which peers share data files, such as music data files, movie data files and application data files. Chunks of files, and copies of them, may be distributed throughout the system.

In a file sharing system using a peer-to-peer network, a requestor peer issues a request for a file, or part of a file, from a provider peer. In some implementations, a centralized index allows requestor peers to identify potential provider peers and issue requests to the provider peers for the file, or part of the file. In implementations without a centralized index, a requestor peer broadcasts messages through the peer-to-peer network. A peer responds as a provider peer if the peer has the requested data; otherwise the peer merely passes on the request to another peer. A peer may cache any requested data that it passes along from the provider peer to the requestor peer if the network topology does not permit the provider peer to transmit the data directly to the requestor peer.

In such a system, each peer is aware of the identity of the requestor peer, the identity of the provider peer that has the requested data, and the identity of the requested data.

SUMMARY

This Summary is provided to introduce a selection of concepts in a simplified form that are further described below in the Detailed Description. This Summary is intended neither to identify key or essential features, nor to limit the scope, of the claimed subject matter.

To provide a computer system permitting peer-to-peer data transfers with privacy with respect to the identities of requestor peers, provider peers and the requested data, the computer system encrypts each communication among peers, and each message, whether a request or response, is transmitted through at least one intermediate peer.

Further, each message includes an identifier of an intermediate peer to which the message is being sent, and an encrypted address payload, to be decrypted by the intermediate peer. After decryption, the payload identifies the next peer to which the message is to be sent and a further encrypted address payload to be sent to that next peer. The encrypted address payload of the request message can include an encrypted address payload to be decrypted by the provider peer for returning the requested data. This payload identifies an intermediate peer and provides an encrypted address payload to be used by the intermediate peer to eventually route the requested data to the requestor peer.

When initially requesting data, a requestor peer generates a request message with an identifier of an intermediate peer to which the request is sent, and an encrypted address payload including at least one address of a next peer to whom the request message is sent and an encrypted address payload for that next peer. In a peer-to-peer network with a centralized index, the centralized index can provide an identity of an intermediate peer and an encrypted address payload to the requestor peer. Communications to the centralized index can be made using the same kind of protocol to anonymize the requestor from the centralized index.

In some implementations, the encrypted address payload can include a plurality of addresses for a plurality of peers, from which the intermediate peer can select one to communicate the message.

Thus, each message received by any peer in the system appears the same to each peer in the sense that the message does not reveal how many intermediate peers have processed or will process the message. Further, a source of content is not revealed as a source; and a requestor of content is not revealed as a requestor.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
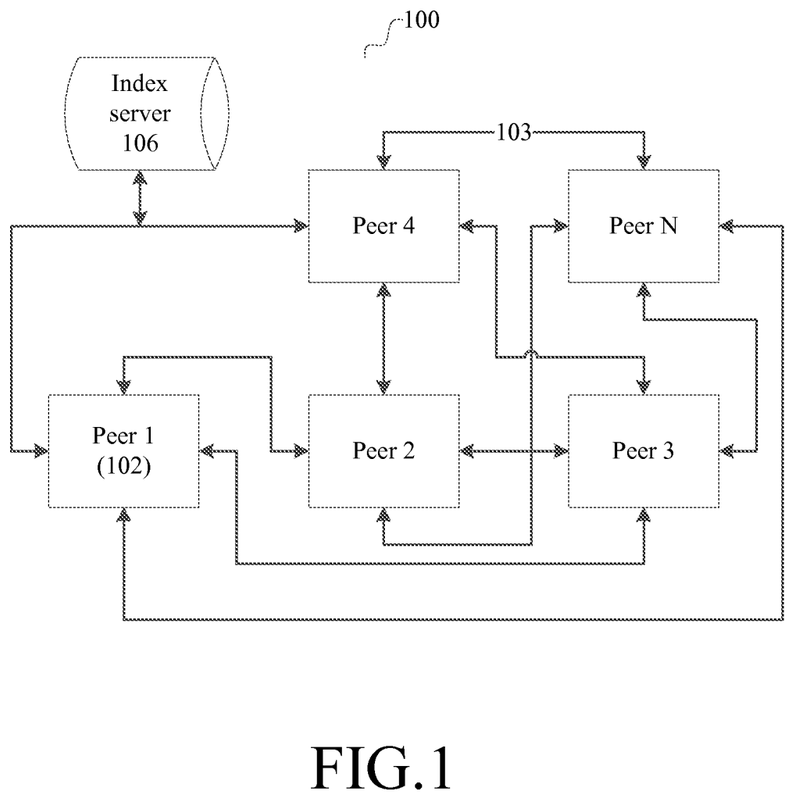
FIG. 1 is a block diagram of an illustrative example of a peer-to-peer network.

Referring to FIG. 1, an illustrative example of a peer-to-peer network will now be described.

In FIG. 1, a peer-to-peer network 100 comprises a plurality of computers 102 (labelled "peer 1" through "peer N"), each of which can be referred to as a peer, interconnected over a computer network, illustrated in part at 103. The number of computers 102 shown in FIG. 1 is merely illustrative; any number N of peer computers can be used. The set of peers is dynamic and scalable in the sense that any computer can be added to or removed from the plurality of computers forming the peer-to-peer network. A computer implementing a peer can be in the form of a computer such as described in more detail below in connection with FIG. 6. Each peer computer includes a computer program that is executed by the computer to configure the computer to implement the communication protocols of the peer-to-peer network, and to work with other applications, operating system and file system on the computer, to implement file sharing.

The computer network 103 shown in FIG. 1 is merely illustrative, showing direct connections between each pair of computers 102. The network topology can be any kind of computer network topology. Some of the computers 102 may communicate with each other over a local area network, whereas others may communicate with each other over a wide area network, and the computer network can include a combination of both private networks and publicly-accessible networks, such as the Internet.

Each computer 102 on the peer-to-peer network 100 implements a communication protocol through which each computer can request, or respond to requests for, data. For example, the peer-to-peer network 100 can be used to implement a shared file system in which the peers share data files, such as music data files, movie data files and application data files.

In the example implementation shown in FIG. 1, the peer-to-peer network 100 includes a centralized index on an index server 106, to which any of the peers can connect (although FIG. 1 illustrates a connection of the index server only to Peers 1 and 4). The centralized index indicates, for each peer, an indication of the files or other data accessible from that peer through the peer-to-peer network. Such an index can be implemented in many ways, such as a mapping of file names to peers, a listing of file names by peer, a mapping of hashes of file contents to peers, and the like. The techniques described herein are not limited to any particular kind of index and can be used in peer-to-peer networks without an index.

To provide a computer system permitting peer-to-peer data transfers with privacy with respect to the identities of requestor peers, provider peers and the requested data, the computer system encrypts pertinent information in each communication among peers, and each message, whether a request or response, is transmitted through at least one intermediate peer.

In one implementation, in the computer network 103 implements a TCP/IP protocol, communication between peers can be secured using the hypertext transfer protocol (HTTP) over an encrypted SSL/TLS (secure sockets layer/transport layer security) connection (thus, an HTTPS connection). It is possible to have an application implementing the functionality of the peer on a peer computer, with HTTPS connections occurring between these applications on two peers. Such applications can be configured to execute using protected memory or chip-based security and have their own HTTPS encryption keys and certificates. Such an implementation can provide the encrypted address payloads as described herein in manner that protects the decrypted payload on a peer from access by other applications executed on that peer.

Further, each message includes an identifier of an intermediate peer to which the message is being sent, and an encrypted address payload, to be decrypted by the intermediate peer. After decryption, the payload identifies the next peer to which the message is to be sent and a further encrypted address payload to be sent to that next peer. The encrypted address payload of the request message can include an encrypted address payload to be decrypted by the provider peer, for returning the requested data. This payload identifies an intermediate peer and provides an encrypted address payload to be used by the intermediate peer to eventually route the requested data to the requestor peer.

When initially requesting data, a requestor peer generates a request message with an identifier of an intermediate peer to which the request is sent, and an encrypted address payload including at least one address of a next peer to whom the request message is sent and an encrypted address payload for that next peer. In a peer-to-peer network with a centralized index, the centralized index can provide, to a requestor peer, an identity of an intermediate peer and an encrypted address payload. Communications with requestor peers and the centralized index can be made using the same kind of protocol to anonymize the requestor from the centralized index.

In some implementations, the encrypted address payload can include a plurality of addresses for a plurality of peers, from which the intermediate peer can select one to communicate the message.

Thus, each message received by any peer in the system appears the same to each peer in the sense that the message does not reveal how many intermediate peers have processed or will process the message.

An example implementation of such a peer-to-peer network will be further described in connection with FIGS. 2 through 5.

Figure 2:
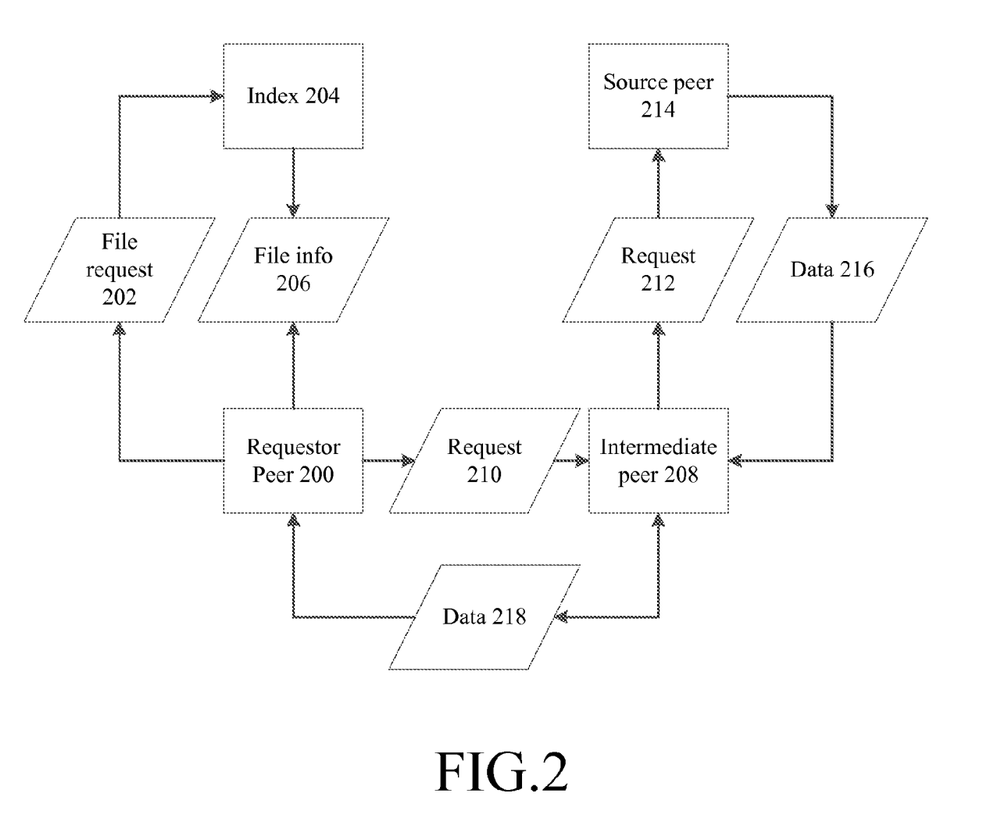
FIG. 2 is a data flow diagram for an example data transfer.

Referring to FIG. 2, a data flow diagram of data transfer in a peer-to-peer network will now be described in the context of accessing of file. In such a data flow diagram, rectangles represent modules of a computer that configure the computer to process data, and parallelograms represent data, and connections between rectangles through the parallelograms represent the transfer of data from an output of one module to an input of another module. A requestor peer 200 issues a file information request 202 to an index 204, requesting information enabling the requestor peer to access a file. The index 204 can implement a centralized or partial index of files available in the peer-to-peer network. The index 204 returns, to the requestor peer, file information 206 for retrieving the requested file from one or more peers in the peer-to-peer network. The file may be divided into multiple parts, of which one or more copies may be distributed among the multiple peers.

The file information 206 can include an identifier of an intermediate peer (e.g., 208), and an encrypted address payload for use by the intermediate peer for further requesting data from the requested file from other peers in the peer-to-peer network. The encrypted address payload includes, when decrypted, an indication of a next peer to which the intermediate peer is to send a request, and an encrypted address payload for that next peer to process. The requestor peer 200 transmits a request 210, incorporating the encrypted address payload from the file information 206, to the intermediate peer 208 identified in the file information 206. The intermediate peer 208 receives the request 210, and processes the encrypted address payload to extract the indication of a next peer to which the intermediate peer is to send a request, and a next encrypted address payload for that next peer to process.

The intermediate peer 208 then transmits a request 212 to the peer identified in the extracted address payload, in this illustration shown as the source peer 214. This request 212 is structured similarly to request 210 in that it further includes the next encrypted address payload that will be processed by the source peer 214. Thus, the intermediate peer 208, when sending the request 212 to the source peer 214, cannot determine that the source peer 214 is the final destination of the request, and thus the source of the requested data.

The source peer 214 processes the request 212 to extract information from the encrypted address payload of the request 212. From this extracted information, the source peer 214 can determine whether it is the source of the requested data, or otherwise is acting as yet another intermediate peer. For example, if there is no next peer identified in the decrypted payload, then this peer is the source peer and can return the requested data to the intermediate peer from which this peer received the request. If a peer determines that it is the source peer, it returns the requested data 216, again through an intermediate peer such as 208. In similar fashion, the intermediate peer 208 processes the requested data 216, and returns the requested data as data 218 to the requestor peer 200.

Figure 3:
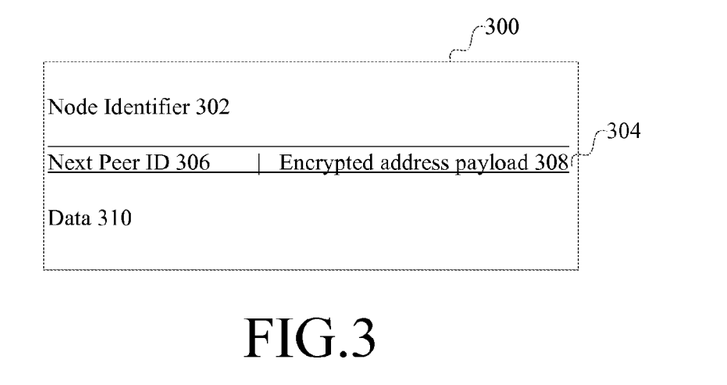
FIG. 3 a diagram of an example message structure for use in a peer-to-peer network.

Referring now to FIG. 3, an example implementation of a structure for a message used in this peer-to-peer network will now be described.

In this example, message 300 includes a peer identifier 302 indicating a peer to which the message is directed. The message 300 further includes the encrypted address payload 304. This payload 304 can include various data and is encrypted in a manner that the peer, to which the message is directed, can decrypt its contents. The encrypted address payload, when decrypted, can include a next peer identifier 306, indicating the next peer in a chain of peers through which the message will pass to a final destination. The next peer identifier 306 can be an identifier of a provider peer for the requested source data, or yet another intermediate peer. A further encrypted address payload 308 also can be included. This payload 308 is encrypted in a manner in which the next peer, identified by next peer identifier 306, can decrypt. Finally, additional data 310, such as a name of file being requested, or the requested data being returned, can be included in the message 300. This additional data 310 may be encrypted.

Figure 4:
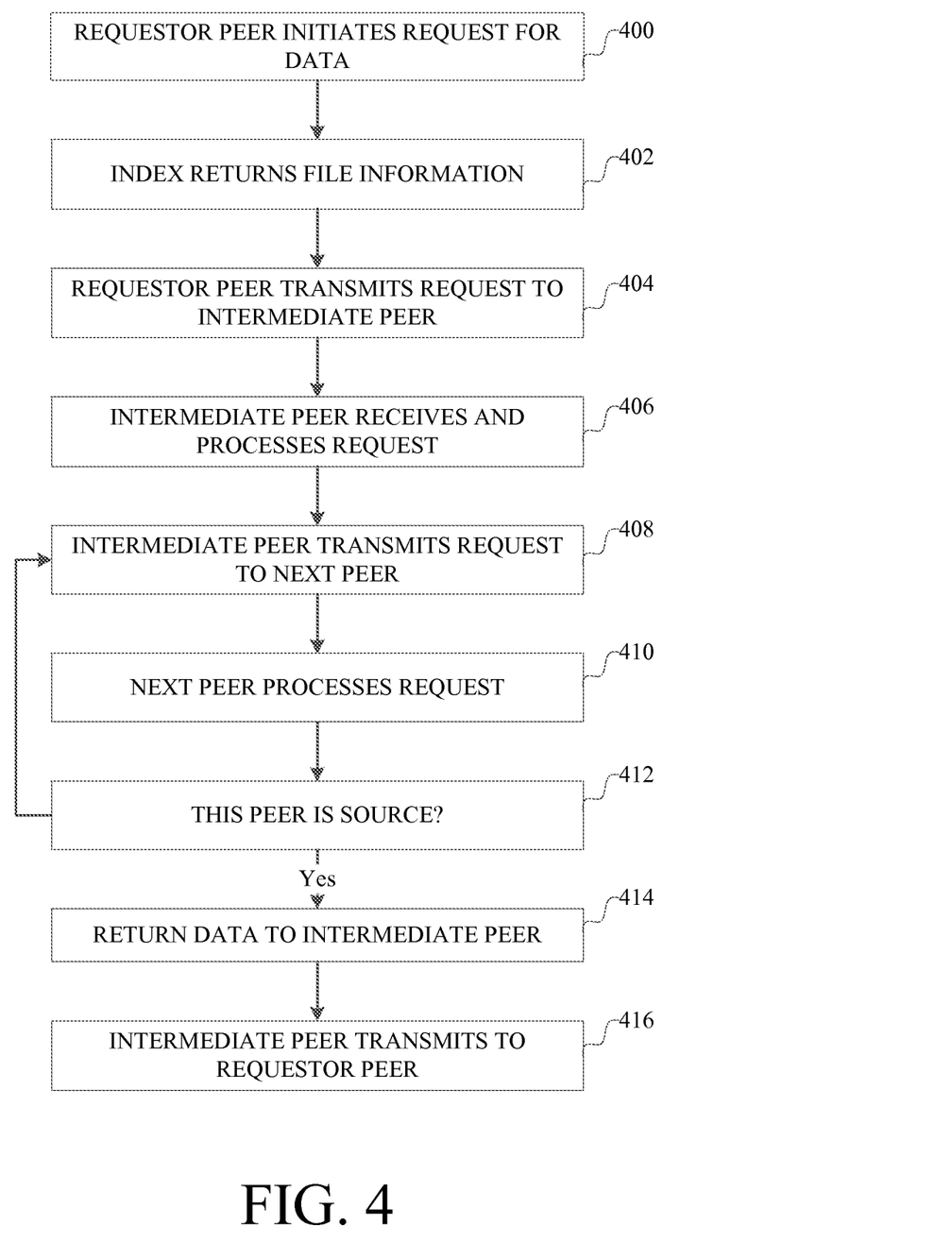
FIG. 4 is a flow chart describing an example data transfer.

Referring now to FIG. 4, a flowchart describing operation of such a system will now be described.

A requestor peer initiates 400 a request for data. In this example, the request is directed to an index, such as index 106 in FIG. 1. The index returns (402) to the requestor peer, and the requestor peer receives, file information indicating one or more intermediate peers to which to send a request for data, and an encrypted address payload for such a request. The requestor peer then transmits 404 a request to the indicated intermediate peer, including the encrypted address payload received from the index. The intermediate peer receives 406 and processes the message with the encrypted address payload. By decrypting the encrypted address payload, the intermediate peer identifies a next peer in the peer-to-peer network to which to transmit the request. The intermediate peer then transmits 408 a request to the identified next peer. That next peer receives 410 and processes the message from the intermediate peer. If that next peer is the source of the requested data as determined at 412, then that peer responds 414 to the intermediate peer with the requested data; otherwise steps 408 through 412 repeat until the next peer is the source of the requested content. The intermediate peer then forwards 416 the data to the requestor peer.

Figure 5:
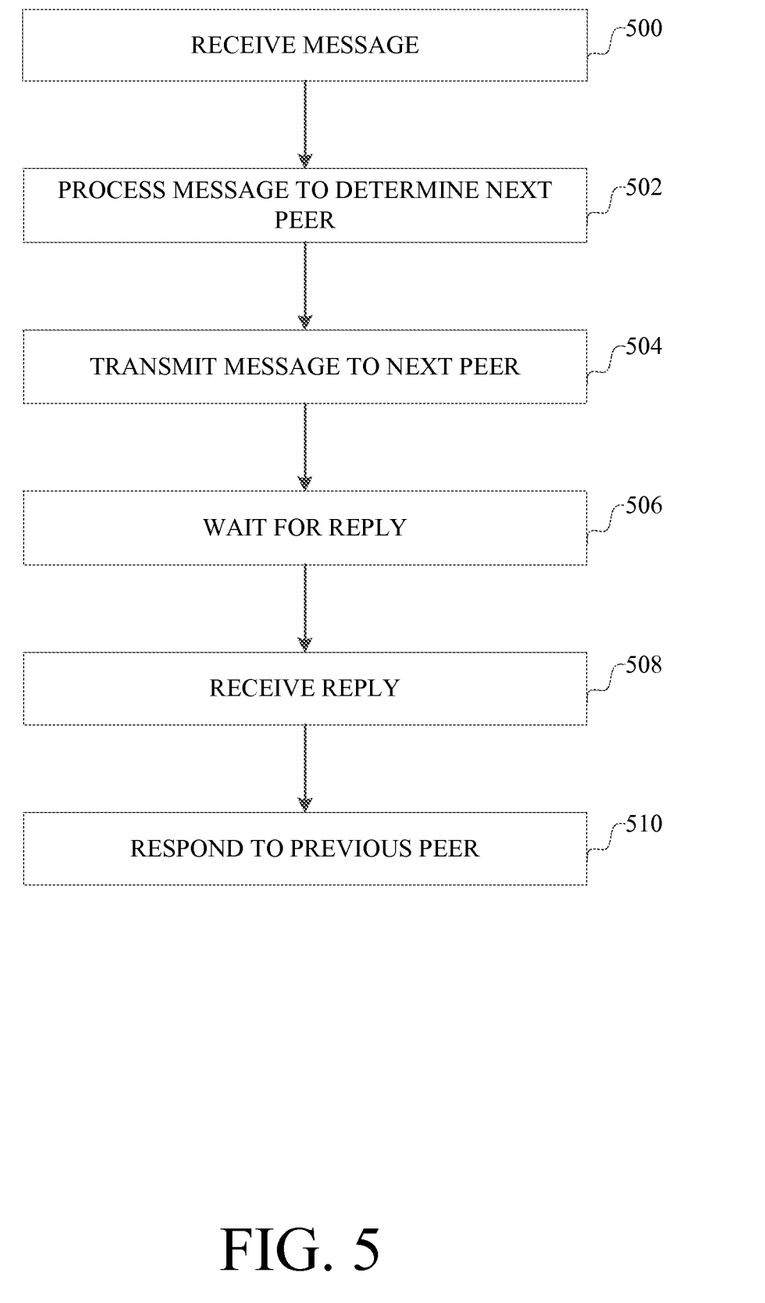
FIG. 5 is a flow chart describing an example operation of an intermediate peer during a data transfer.

Referring now to FIG. 5, a view of this process from the point of view of an intermediate peer will now be described. An intermediate peer receives 500 a message from a peer. The intermediate peer processes 502 the message from a previous peer and determines the next peer to which to convey the message. The intermediate peer transmits 504 the message to the next peer and waits 506 for a reply. After receiving 508 a reply, the intermediate peer responds 510 to the previous peer with the contents of the reply. If a peer is a source of the requested data, then the process performed by a source peer is the same as the process performed by an intermediate peer, except that the source peer detects that it is the source and simply responds to the previous peer with the requested data.

In the foregoing example implementations, and other implementations, each peer can have its own set of public and private keys to enable encrypted communication between each set of peers. In such a system, a key management server computer may be included in the peer-to-peer network for issuing and storing keys. In one implementation, such keys can be provided along with certificates using an implementation of HTTPS.

In the foregoing example implementations, and other implementations, the selection of the intermediate peer can be based on one or more factors. Such factors can include a random or pseudo-random selection, transfer speed between the intermediate peer and the source peer, transfer speed between the intermediate peer and the requestor peer, network topology, geolocation information, or yet other information, or any combination of any two or more of the foregoing.

In the foregoing example implementations, and other implementations, data can be divided into multiple parts. Each part can be assigned a different source peer and a different intermediate peer for transfer to the requestor peer. With a large number of peers to select from as intermediate peers, and further requesting parts of data from multiple sources through selected intermediate peers, further obscures the identities of requestors, sources and requested content.

In the foregoing example implementations, and other implementations, requested data can be assigned to multiple intermediate peers and/or multiple source peers. Thus, a requestor peer may receive multiple candidate intermediate peers from which it can select. Additionally, or alternatively, an intermediate peer may receive multiple candidate source peers (or further intermediate peers) from which it can select.

Using such a protocol for peer-to-peer transfers in a peer-to-peer network, each message received by any peer in the system appears the same to each peer in the sense that the message does not reveal how many intermediate peers have processed or will process the message. Further, a source of content is not revealed as a source; and a requestor of content is not revealed as a requestor.

Figure 6:
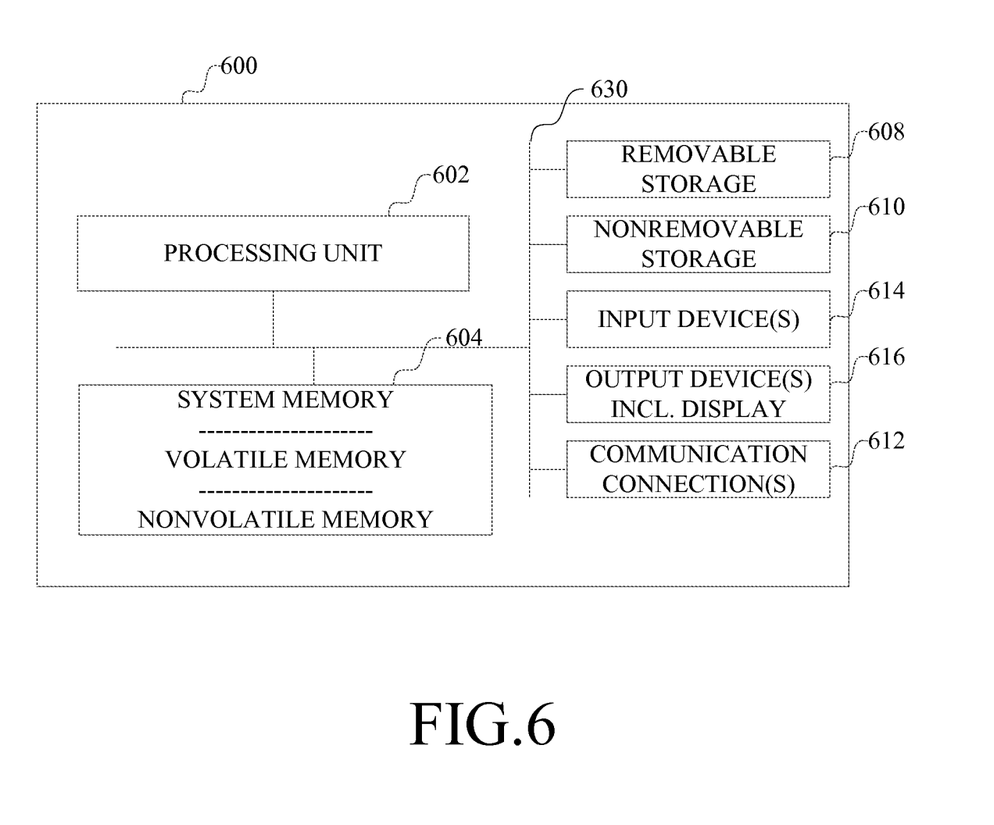
FIG. 6 is a block diagram of an example computer.

Having now described an example implementation, FIG. 6 illustrates an example of a computer with which such techniques can be implemented to provide a peer computer or index in a peer-to-peer network. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 6, a computer 600 includes at least one processing unit 602 and memory 604. The computer can have multiple processing units 602 and multiple devices implementing the memory 604. A processing unit 602 can include one or more processing cores (not shown) that operate independently of each other. Additional co-processing units also can be present in the computer. The memory 604 may include volatile devices (such as dynamic random access memory (DRAM) or other random access memory device), and nonvolatile devices (such as a read-only memory, flash memory, and the like) or some combination of the two. Other storage, such as dedicated memory or registers, also can be present in the one or more processors. The computer 600 can include additional storage, such as storage devices (whether removable or non-removable) including, but not limited to, magnetically-recorded or optically-recorded disks or tape. Such additional storage is illustrated in FIG. 6 by removable storage device 608 and non-removable storage device 610. The various components in FIG. 6 are generally interconnected by an interconnection mechanism, such as one or more buses 630.

A computer storage medium is any medium in which data can be stored in and retrieved from addressable physical storage locations by the computer. Computer storage media includes volatile and nonvolatile memory, and removable and non-removable storage devices. Memory 604, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 600 may also include communications connection(s) 612 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 612 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media.

The computer 600 may have various input device(s) 614 such as a pointer device, keyboard, touch-based input device, pen, camera, microphone, sensors, such as accelerometers, thermometers, light sensors and the like, and so on. The computer 600 may have various output device(s) 616 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 610, communication connections 612, output devices 616 and input devices 614 can be integrated within a housing with the rest of the computer, or can be connected through various input/output interface devices on the computer, in which case the reference numbers 610, 612, 614 and 616 can indicate either the interface for connection to a device or the device itself as the case may be.

A computer generally includes an operating system, which is a computer program that manages access to the various resources of the computer by applications. There may be multiple applications. The various resources include the memory, storage, input devices and output devices, such as display devices and input devices as shown in FIG. 6.

As an example implementation of a peer computer using a computer, such as shown in Figure, the data flow diagram of FIG. 7 will now be described.

In this diagram, a parallelogram indicates data, whereas a rectangle indicates a module of the analysis computer that performs processing on the data.

A computer such as shown in FIG. 6 can be configured so as to be comprising a receiver 700 configured to receive a request message to be processed by the peer computer. The receiver 700 can be configured to handle communications with other peer computers by implementing a communication protocol part of the communication protocol includes processing a request message directed to the peer computer. The receiver 700 can have an input 702 through which a request message is received. The receiver also can have an output 704 configured to provide the input encrypted payload from the request message to a message processor 706. The receiver can be configured to provide the input encrypted payload to the message processor 706 in any of a number of ways, such as through an application programming interface, or by providing the data in a data structure in a location in memory.

The message processor 706 is configured to determine whether the request message indicates that this peer is a source peer for requested data or an intermediate peer that passes on output encrypted payload to yet another peer computer. For example, the message processor 706 can have a first output 712 configured to provide an output encrypted payload to a transmit interface 714 for transmission to a next peer. A second output 710 can be configured to provide an identifier of this next peer to the transmit interface 714. The message processor 706 also can have third output 722 configured to provide a file identifier to storage 726. The message processor 706 can have an input 724 configured to receive the corresponding file data from the storage 726 and initiate a process of transmitting the requested data as part of an output encrypted payload to the original requestor peer through one or more intermediate peers.

The transmit interface 714 is configured to transmit an encrypted payload to a peer as identified by the message processor. The transmit interface 714 can have a first input 716 configured to receive the output encrypted payload from the message processor 706. The transmit interface can have a second input 718 configured to receive the indication of the peer to which the output encrypted payload should be transmitted. The transmit interface has an output 720 configured to transmit the message to the next peer. The transmit interface can be configured to handle communications with the other peer computers by implementing the communication protocol used by them. The message processor and transmit interface can be configured to exchange the payload and peer identifier in a number of ways, such as an application programming interface through which the message processor invokes operations of the transmit interface.

The storage 726 is configured to store data accessible to the peer-to-peer file system. For example such storage may be part of the file system of the peer computer and the message processor is a user of the file system with various permissions enabling it to access data in the storage 726. The storage 726 is configured to have an input 728 configured to receive an identifier of a file. After retrieving the requested data, the storage 726 is configured to have an output 730, configured to provide the requested file data to the message processor 706. The storage and message processor can be configured to exchange the file data in a number of ways, such as an application programming interface through which the message processor invokes operations of a file system managing the storage 726.

Figure 7:
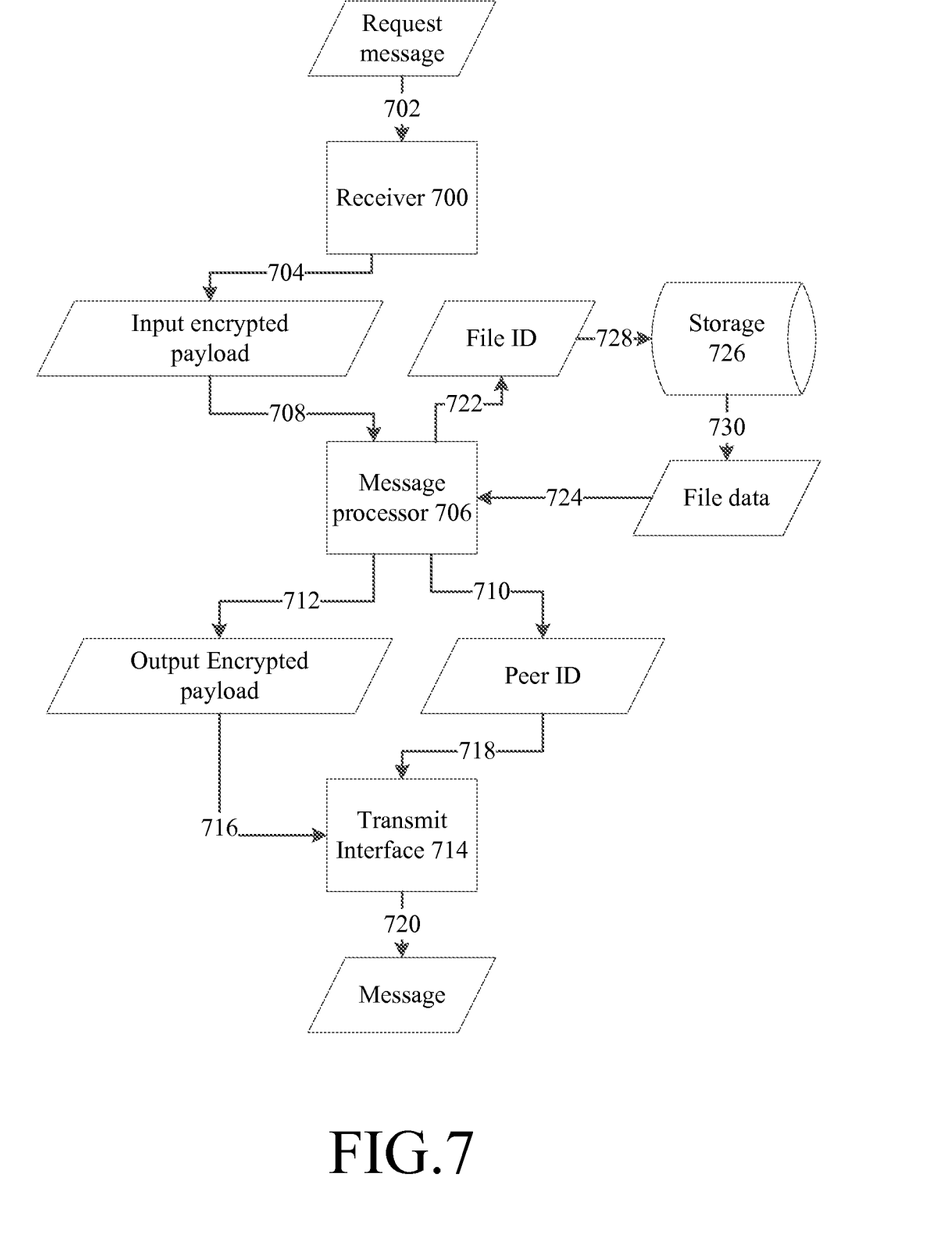
FIG. 7 is a data flow diagram of an example peer computer.

The various modules of FIG. 7, as well as any operating system, file system and applications on a computer in FIG. 6, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a peer computer, for use in a peer-to-peer computer network configured to support peer-to-peer data transfers among a plurality of peer computers, comprises a processing system comprising at least one processing unit and storage including computer program instructions to configure the processing system. The processing system, when executing the computer program instructions, comprises a receiver configured to receive request messages, each request message including an identifier of a peer computer to which the message is being sent, and an encrypted address payload. A message processor is configured to decrypt the received request message to identify a next peer from among the plurality of peer computers to which the request message is to be sent, and to extract a further encrypted address payload to be sent to the next peer. A transmit interface is configured to transmit the further encrypted address payload to the next peer.

In another aspect a peer computer, for use in a peer-to-peer computer network configured to support peer-to-peer data transfers among a plurality of peer computers, comprises a means for receiving request messages, each request message including an identifier of a peer computer to which the message is being sent, and an encrypted address payload. The peer computer further comprises means for decrypting the received request message to identify a next peer from among the plurality of peer computers to which the request message is to be sent, and to extract a further encrypted address payload to be sent to the next peer. The peer computer further comprises means for transmitting the further encrypted address payload to the next peer.

In another aspect, a process performed by a peer computer in a peer-to-peer computer network comprises the peer computer receiving a request message, the request message including an identifier of the peer computer receiving the message, and an encrypted address payload. The peer computer decrypts the received request message to identify a next peer from among the plurality of peer computers to which the request message is to be sent, and to extract a further encrypted address payload to be sent to the next peer. The peer computer transmits the further encrypted address payload to the next peer.

In another aspect, an index server computer, for use in a peer-to-peer computer network configured to support peer-to-peer data transfers among a plurality of peer computers, comprises a processing system comprising at least one processing unit and storage including computer program instructions to configure the processing system. The processing system, when executing the computer program instructions, is configured to respond to requests for file information for files from peer computers, for providing file information comprising an identifier of an intermediate peer and an encrypted address payload including an identifier of a next peer to which the intermediate peer sends a request for data from a file.

In another aspect, an index server computer, for use in a peer-to-peer computer network configured to support peer-to-peer data transfers among a plurality of peer computers, comprises means responsive to requests for file information for files from peer computers, for providing file information comprising an identifier of an intermediate peer and an encrypted address payload including an identifier of a next peer to which the intermediate peer sends a request for data from a file.

In another aspect, a peer-to-peer computer network comprises a plurality of peer computers, each peer computer comprising a peer computer in any of the foregoing aspects.

In another aspect, a peer-to-peer computer network comprises an index server computer in any of the foregoing aspects, and a plurality of peer computers in any of the foregoing aspects.

In any of the foregoing aspects, the processing system of a peer computer can be further configured by the computer program instructions to determine, from the decrypted received message, if the peer computer is a source of data requested in the message.

In any of the foregoing aspects, the processing system of a peer computer can be further configured by the computer program instructions to transmit the requested data in a message to an intermediate peer.

In any of the foregoing aspects, each message to request data can include at least one intermediate peer computer between a requestor peer and a source peer.

In any of the foregoing aspects, each message to request data can include a plurality of intermediate peers.

In any of the foregoing aspects, the processing system of a peer computer can be further configured by the computer program instructions to access an index as a requestor peer, so as to receive an indication of a plurality of intermediate peers for accessing data, and to select from among the plurality of intermediate peers.

In any of the foregoing aspects, the processing system of a peer computer can be further configured by the computer program instructions to identify a plurality of source peers as the next peer for accessing data and to select from among the plurality of source peers.

In any of the foregoing aspects, requested data can be divided into a plurality of parts, the processing system of a peer computer can be further configured by the computer program instructions to request each of the plurality of parts through a different intermediate peer.

In any of the foregoing aspects, the processing system of a peer computer can be further configured to access an index configured to provide, to a requestor peer, an indication of an intermediate peer for accessing data, the indication of the intermediate peer being selected from among the plurality of peer computers.

In any of the foregoing aspects, the index server can select from a plurality of available intermediate nodes for providing the requested data.

In any of the foregoing aspects, the index server can provide an indication of a plurality of available intermediate nodes for providing the requested data.

In any of the foregoing aspects, the intermediate peer can be selected randomly or pseudorandomly. The intermediate peer can be selected based on transfer speed. The intermediate peer can be selected based on network topology. The intermediate peer can be selected based on geolocation information.

In any of the foregoing aspects, a request for data can be routed through a plurality of intermediate nodes.

In any of the foregoing aspects, encryption can be provided using an encrypted communication channel between applications on the peer computers.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. In a peer-to-peer computer network configured to support peer-to-peer data transfers among a plurality of peer computers, a peer computer comprising:
a processing system comprising at least one processing unit and storage including computer program instructions to configure the processing system to be comprising:
a receiver configured to receive request messages from the plurality of peer computers, each request message including an identifier of a peer computer to which the request message is being sent, and a received encrypted address payload including an encrypted indication of a source peer computer for accessing the requested data;
a message processor configured, when the peer computer is an intermediate peer computer, to decrypt the received encrypted address payload in the received request message to identify another intermediate peer computer from among the plurality of peer computers to which the request message is to be next sent, and to extract a further encrypted address payload to be sent to the other intermediate peer computer for decryption by the other intermediate peer computer;
the processing system further configured, when the peer computer is a requestor peer computer, to generate a request message for requesting data from the plurality of peer computers by accessing, from an index, an indication of an intermediate peer computer and an encrypted address payload for decryption by the intermediate peer computer and including an encrypted indication of a source peer computer for accessing the requested data, wherein the source peer computer is not revealed to the requestor peer computer as a source of the requested data; and
a transmit interface configured to transmit the generated request message with the encrypted address payload to the intermediate peer computer.

2. The peer computer of claim 1, further comprising:
the message processor being further configured to determine, from the decrypted received message, if the peer computer is a source of data requested in the message; and
the processing system being further configured by the computer program instructions to transmit the requested data in a message to an intermediate peer computer.

3. The peer computer of claim 1, wherein each message to request data includes at least one intermediate peer computer between a requestor peer computer and a source peer computer.

4. The peer computer of claim 3, wherein each message to request data includes a plurality of intermediate peer computers.

5. The peer computer of claim 1, further comprising:
the processing system being further configured by the computer program instructions to access an index as a requestor peer computer, so as to receive an indication of a plurality of intermediate peer computers for accessing data; and
the processing system being further configured by the computer program instructions to select from among the plurality of intermediate peer computers.

6. The peer computer of claim 1, further comprising:
the processing system being further configured by the computer program instructions to identify a plurality of source peer computers as the next peer computer for accessing data;
the processing system being further configured by the computer program instructions to select from among the plurality of source peer computers.

7. The peer computer of claim 1, wherein requested data is divided into a plurality of parts, and further comprising:
the processing system being further configured by the computer program instructions to request each of the plurality of parts through a different intermediate peer computer.

8. The peer computer of claim 1, further comprising:
the processing system being further configured to access an index configured to provide, to a requestor peer computer, an indication of an intermediate peer computer for accessing data, the indication of the intermediate peer computer being selected from among the plurality of peer computers.

9. The peer computer of claim 5, wherein the processing system is further configured to select the intermediate peer computer randomly or pseudorandomly.

10. The peer computer of claim 5, wherein the processing system is further configured to select the intermediate peer computer based on transfer speed.

11. A process for peer-to-peer data transfers in a peer-to-peer computer network comprised of a plurality of peer computers, the process, performed by a peer computer, comprising:

the peer computer, when an intermediate peer computer, receiving a request message, the request message including an identifier of the peer computer receiving the message, and a received encrypted address payload including an encrypted indication of a source peer computer for accessing the requested data;

the peer computer, when an intermediate peer computer, decrypting the received encrypted address payload in the received request message to identify another intermediate peer computer from among the plurality of peer computers to which the request message is to be next sent, and to extract a further encrypted address payload to be sent to the other intermediate peer computer for decryption by the other intermediate peer computer;

the peer computer, when a requestor peer computer, generating a request message for requesting data from the plurality of peer computers by accessing, from an index, an indication of an intermediate peer computer and an encrypted address payload for decryption by the intermediate peer computer and including an encrypted indication of a source peer computer for accessing the requested data, wherein the source peer computer is not revealed to the requestor peer computer as a source of the requested data; and the peer computer transmitting the generated request message with the encrypted address payload to the intermediate peer computer.

12. The process of claim 11, further comprising:

the peer computer determining, from a decrypted received message, if the peer computer is a source of data requested in the message;

the peer computer transmitting the requested data in a response message to an intermediate peer computer.

13. The process of claim 11, wherein each message to request data includes at least one intermediate peer computer between a requestor peer computer and a source peer computer.

14. The process of claim 11, further comprising:

the peer computer requesting, from an index, an indication of a plurality of intermediate peer computers for accessing data; and the peer computer selecting from among the plurality of intermediate peer computers.

15. The process of claim 11, further comprising:

the peer computer requesting, from an index, an indication of an intermediate peer computer for accessing data from among the plurality of peer computers, the indication of the selected intermediate peer computer having been selected by the index.

16. A peer-to-peer computer network configured to support peer-to-peer data transfers, comprising:

a plurality of peer computers, each peer computer comprising a processing system comprising at least one processing unit and storage including computer program instructions to configure the processing system, the processing system of the peer computer, when executing the computer program instructions, being configured to receive request messages, each request message including an identifier of a peer computer to which the message is being sent, and an encrypted address payload including an encrypted indication of a source peer computer for accessing the requested data;

the processing system of the peer computer being further configured by the computer program instructions to decrypt the encrypted address payload from the received request message to identify a next peer computer from among the plurality of peer computers to which the request message is to be sent, and to extract a further encrypted address payload to be sent to the next peer computer for decryption by the next peer computer;

the processing system of the peer computer being further configured by the computer program instructions to transmit the further encrypted address payload to the next peer computer; and an index server, the index server comprising a processing system comprising at least one processing unit and storage including computer program instructions to configure the processing system of the index server to respond to requests from the plurality of peer computers to provide to a requestor peer computer an indication of an intermediate peer computer and an encrypted address payload for decryption by the intermediate peer computer including an encrypted indication of a source peer computer for accessing the requested data wherein the source peer computer is not revealed to the requestor peer computer as a source of the requested data.

17. The peer-to-peer computer network of claim 16, wherein the index server is further configured to select from a plurality of available intermediate peer computers for providing the requested data.

18. The peer-to-peer computer network of claim 16, wherein the index server is further configured to provide an indication of a plurality of available intermediate peer computers for providing the requested data.

19. The peer-to-peer computer network of claim 18, wherein the peer computer is further configured to select from the plurality of available intermediate peer computers.

* * * * *